No. 626,951. Patented June 13, 1899.
J. D. WILLIAMSON, Jr.
POWER STEERING MECHANISM.
(Application filed Nov. 10, 1898.)
(No Model.) 3 Sheets—Sheet 1.
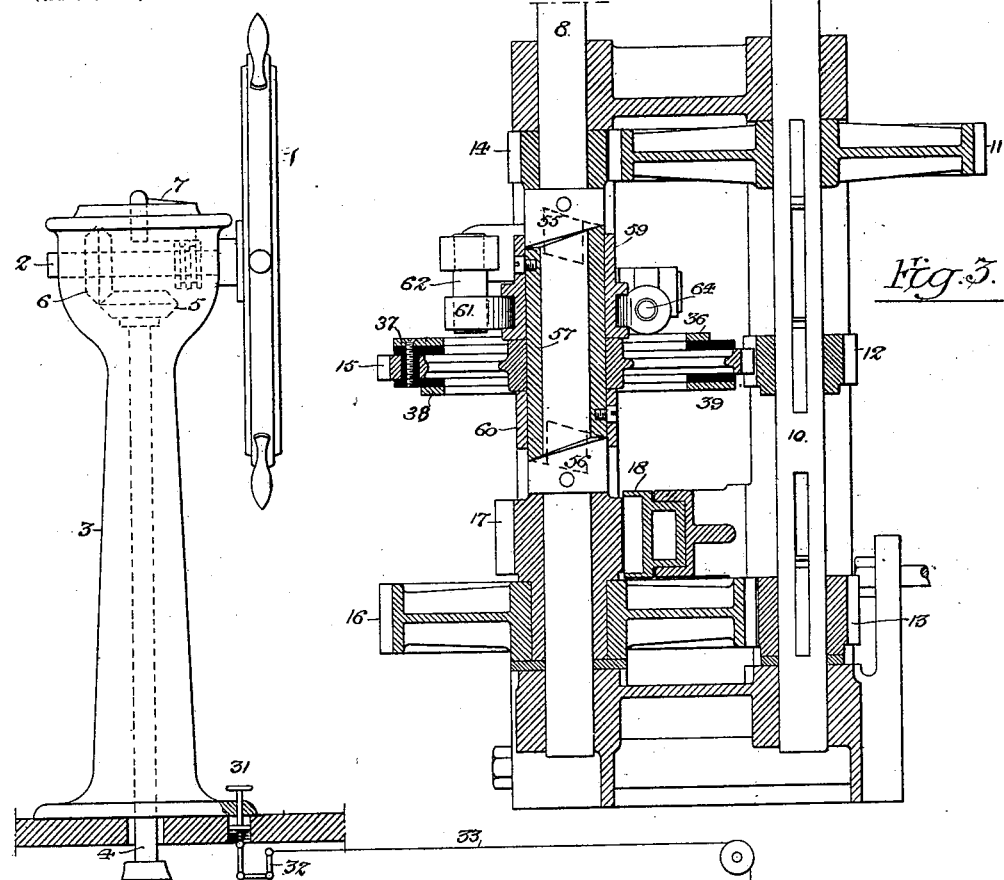

No. 626,951. Patented June 13, 1899.
J. D. WILLIAMSON, Jr.
POWER STEERING MECHANISM.
(Application filed Nov. 10, 1898.)
(No Model.) 3 Sheets—Sheet 2.
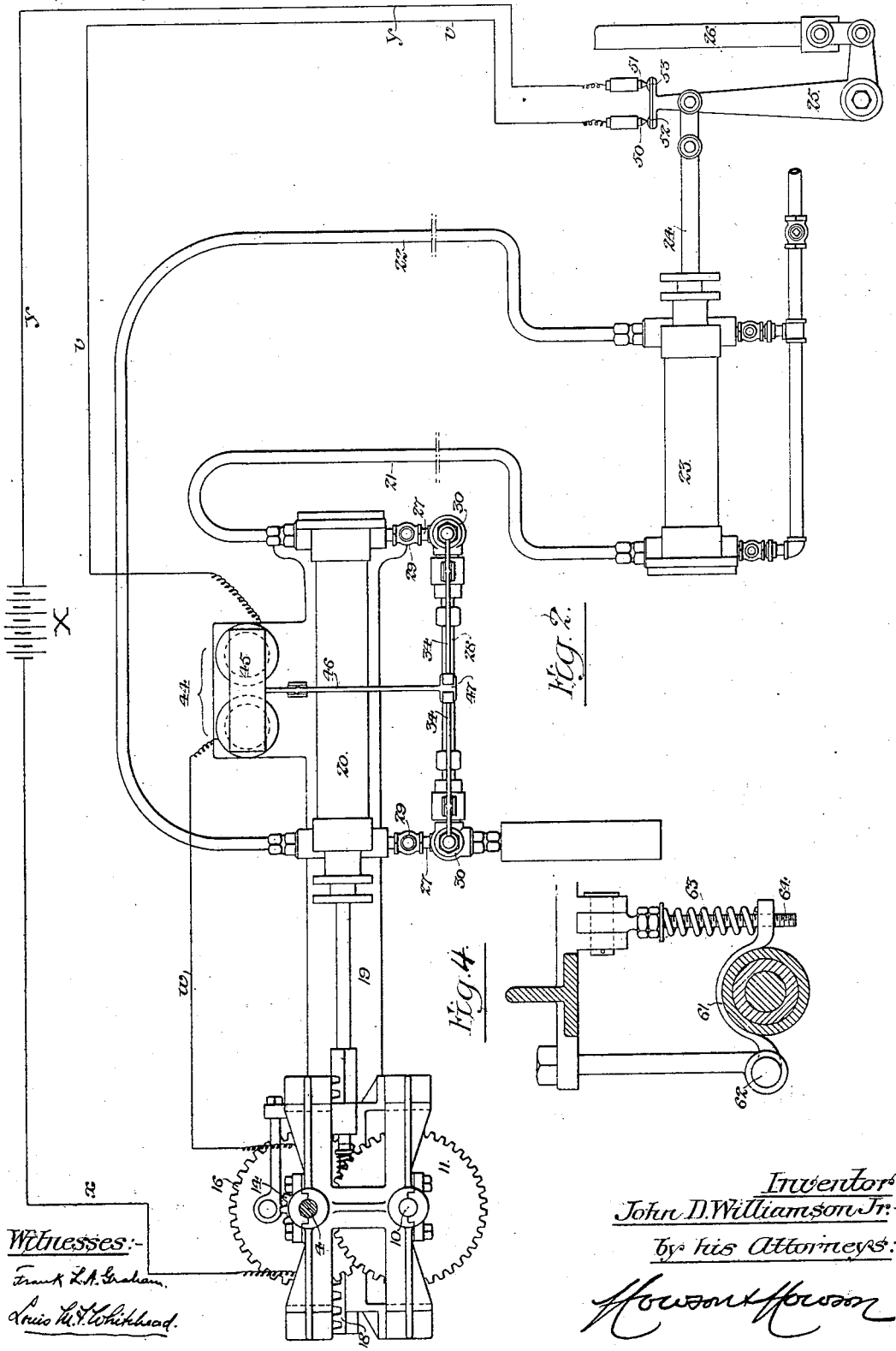
Witnesses:—
Frank L. A. Graham
Louis M. Whitehead
Inventor:
John D. Williamson Jr.
by his Attorneys:—
Howson & Howson

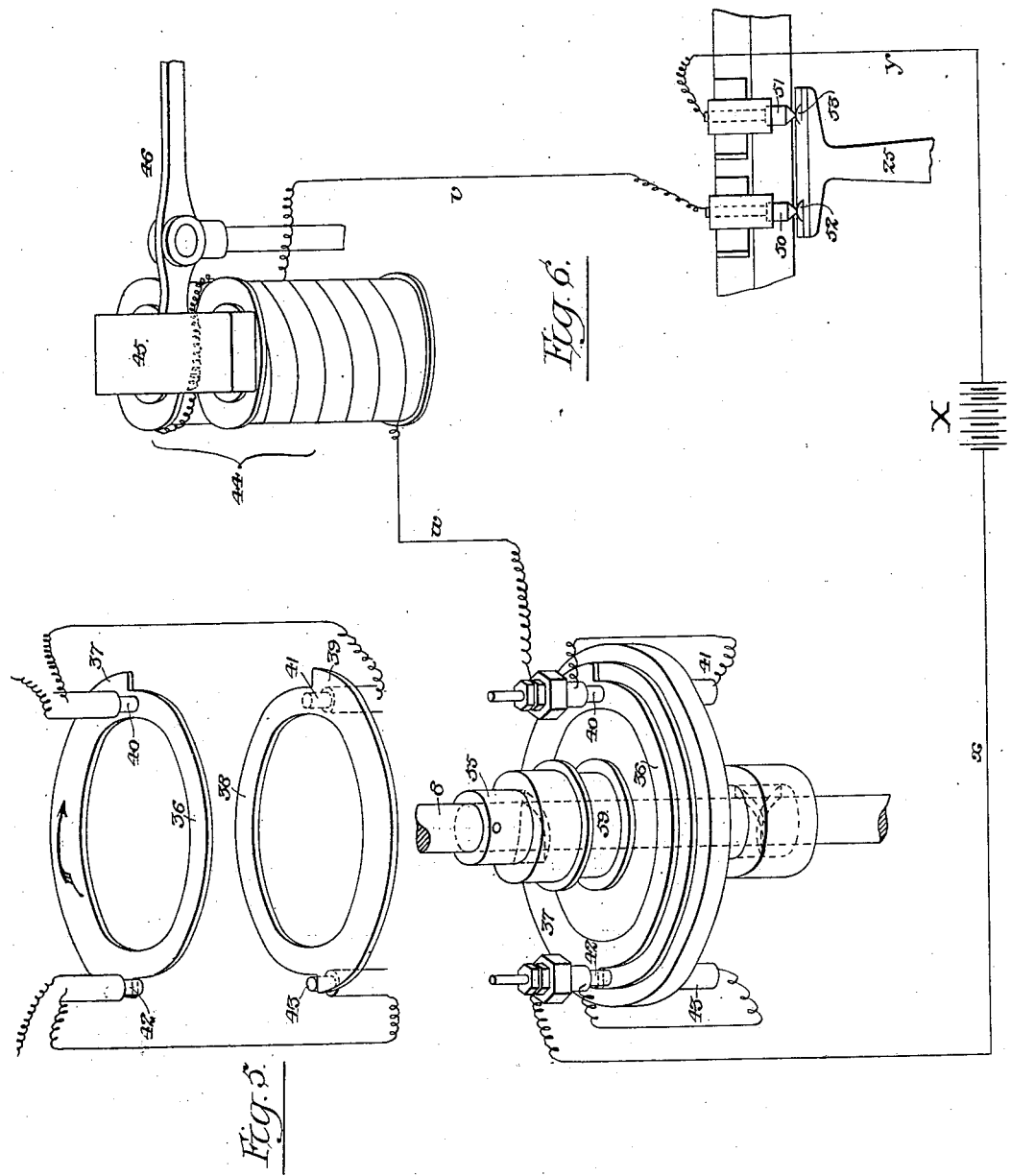

---

UNITED STATES PATENT OFFICE.

JOHN D. WILLIAMSON, JR., OF PHILADELPHIA, PENNSYLVANIA, ASSIGNOR TO THE WILLIAMSON BROTHERS COMPANY, OF SAME PLACE.

POWER STEERING MECHANISM.

SPECIFICATION forming part of Letters Patent No. 626,951, dated June 13, 1899.

Application filed November 10, 1898. Serial No. 696,051. (No model.)

*To all whom it may concern:*

Be it known that I, JOHN D. WILLIAMSON, Jr., a citizen of the United States, residing in Philadelphia, Pennsylvania, have invented certain Improvements in Power Steering Mechanism, of which the following is a specification.

The object of my invention is to provide power steering apparatus with an electromagnetic compensating device whereby any variation between the actual position of the rudder and that indicated by the telltale at the steering-wheel will be automatically corrected whenever the rudder is set amidships.

In the accompanying drawings, Figure 1 is a side elevation of sufficient of a power-operated steering-gear to illustrate my invention. Fig. 2 is a plan view of the same. Fig. 3 is an enlarged vertical section of part of the mechanism. Fig. 4 is a sectional plan view of part of the same, and Figs. 5 and 6 are diagrams illustrating the electrical connections and parts operating in conjunction therewith.

The steering-wheel (represented at 1 in Fig. 1) is carried by a short horizontal shaft 2 at the top of a standard 3, which also has bearings for a vertical shaft 4, the latter being geared by means of suitable bevel-wheels 5 and 6 to the steering-wheel shaft 2. The latter shaft is also connected by worm or other gearing to the spindle of a pointer or telltale 7 at the top of the standard 3, so that as the steering-wheel is turned to port or starboard motion in corresponding direction is imparted to said telltale. The lower end of the shaft 4 is coupled to the upper end of a shaft 8, which is adapted to suitable bearings in a frame 9 beneath the platform or deck on which the standard 3 is mounted, and to other bearings in said frame is adapted a shaft 10, parallel with the shaft 8 and located a short distance laterally therefrom, said shaft 10 having upon it a spur-wheel 11 and two spur-pinions 12 and 13. The spur-wheel 11 meshes with a spur-pinion 14, secured to the shaft 8, and the pinion 12 meshes with a spur-wheel 15, free to turn independently of the shaft 8 and carrying certain electrical contact-plates, referred to hereinafter, the pinion 13 meshing with a spur-wheel 16, which is secured to the hub of a spur-pinion 17, likewise free to turn on the shaft 8 and meshing with a longitudinal rack 18, which is suitably guided in a bearing in the frame 9 and is connected to the rod 19 of a piston contained in a cylinder 20, pipes 21 and 22 providing communication between the opposite ends of this cylinder and the opposite ends of a cylinder 23, which contains a piston having a rod 24, connected to a bell-crank lever 25, which is connected to the rod 26, whereby the operation of the rudder-moving mechanism is governed, or the movement of the piston-rod 24 may be transmitted directly to the rudder, if desired, in the smaller class of vessels. As the steering-wheel is turned in one direction or the other therefore the piston will be caused to traverse back and forth in the cylinder 20, and the liquid with which said cylinder is filled will be forced through the pipes 21 and 22, so as to cause movement of the piston in the cylinder 23.

For convenience the cylinder 20 may be called the "transmitting-cylinder" and the cylinder 23 the "controlling-cylinder."

The rudder-operating mechanism is such that the position of the rudder corresponds with the position of the piston in the controlling-cylinder 23—that is to say, when said piston is at one extreme of its movement the rudder is hard over to starboard, when the piston is at the other extreme of its movement the rudder is hard over to port, and when the piston is in the intermediate position or mid-stroke the rudder is amidships. These positions of the piston in the cylinder 23 should, when the apparatus is working properly, be attended by like adjustments of the piston in the transmitting-cylinder 20; but it sometimes happens because of leakage around the latter piston or from other causes that the two pistons are not in proper relation—that is to say, when the piston in the controlling-cylinder 23 is at mid-stroke the piston in the transmitting-cylinder 20 may be more or less to one side of mid-stroke, and as the telltale on the standard 3 corresponds with the position of the piston in the cylinder 20 it may, when the helm is actually amidship, indicate a position of helm more or less to port or starboard. For this reason it has been proposed to provide the cylinder 20 with pipes 27 and 28, forming a communication between the opposite ends of the cylinder, the pipes 27 being provided with check-valves 29 and suitable stop-valves 30 being placed at the junction of the pipes 27 and 28, so that these valves can when necessary be opened, so as to provide a free passage of liquid from one end of the cylinder 20 to the other, consequently permitting movement of the piston in said cylinder 20 without any flow of liquid through the pipes 21 and 22 and without any corresponding movement of the piston in the cylinder 23.

Hitherto in order to detect variance between the true position of the rudder and its position as indicated by the telltale at the top of the standard 3 it has been necessary to have in the pilot-house a second telltale connected to the rudder and indicating the true position of the latter, and constant comparison of these two telltales by the steersman was necessary in order that any variance might be detected and corrected. Such correction was effected by mechanical means operated by the steersman, the devices shown in the drawings comprising a foot-plate 31 at the base of the standard 3, the stem of this foot-plate being connected to a bell-crank lever 32 and the latter by means of a cord or wire 33 being connected to levers 34, whereby the valve 30 could by pressure upon the plate 31 be opened at the proper times, so as to provide free communication between the opposite ends of the cylinder 20.

The above description represents the present state of the art as known to me, and my invention consists of electromagnetic devices whereby the compensation of the actuating-cylinder 20 may be effected automatically. These devices I will now proceed to describe.

On the top of the spur-wheel 15 is a metallic ring 36, suitably insulated from said wheel and having throughout about one-half of its extent a projecting segment 37, and on the under side of said spur-wheel 15 is a ring 38, which is likewise insulated from the wheel and has throughout about one-half of its extent a projecting segment 39, the two segments 37 and 39 occupying positions on opposite sides of the axial line of said spur-wheel, as shown in the diagram Fig. 5.

Suitably mounted on the frame 9 are upper and lower contacts 40 and 41, preferably yielding contacts, the upper contact 40 being in line with the upper-contact ring 36 of the spur-wheel 15 and the lower contact 41 being in line with the lower-contact ring 38 of said wheel. At the opposite side of the frame 9 are upper and lower contacts 42 and 43, which are in line, respectively, with the upper and lower contact segments 37 and 39, the latter being so disposed in respect to said contacts 42 and 43 that when the piston occupies a mid-position in the cylinder 20 both of said contacts 42 and 43 will be free from engagement with their respective segments, movement of the spur-wheel 15 and its plates in one direction bringing the contact 42 into engagement with the segment 37 and movement of the spur-wheel and its plates in the opposite direction bringing the contact 43 into engagement with the segment 39. The contacts 42 and 43 are connected by means of a wire $x$ to one pole of a battery X or other generator of electricity, the contacts 40 and 41 being connected by a wire $w$ to the coils of an electromagnet 44. This electromagnet acts upon an armature 45, carried by a lever 46, which has a plate 47 acting through the medium of springs 48 upon the levers 34, which actuate the valves 30, whereby communication is opened between the opposite ends of the cylinder 20. The coils of the electromagnet 44 are also connected by a wire $v$ to a terminal 50, suitably mounted adjacent to the end of the bell-crank lever 25, which is operated by the piston in the cylinder 23.

Mounted alongside of the terminal 50 is a similar terminal 51, which is connected by means of a wire $y$ to that pole of the battery or other generator of electricity opposite to the pole which is connected to the contacts 42 and 43.

The end of the bell-crank lever 25 is widened and carries a contact with two lugs 52 and 53, and when the bell-crank lever is in the mid-position corresponding with the midship position of the rudder these lugs strike the terminals 50 and 51, respectively, and electrically connect said terminals. If at this time the spur-wheel 15 is also in midship position, the contacts 42 and 43 will be free from engagement with the segments 37 and 39, and hence the circuit through the coils of the electromagnet 44 will be broken and there will be no actuation of the armature 45 and lever 46 and no opening of the valves 30; but if the spur-wheel 15 occupies a position to one side or the other of the midship-line, implying a departure of the piston in the cylinder 20 from its proper midship position, one or other of the contacts 42 and 43 will be in engagement with its respective segment, and consequently the electrical circuit through the magnet 44 will be completed, said magnet will be energized, the armature 45 attracted, and the valves 30 opened, said valves remaining open until the piston in the cylinder 20 and the spur-wheel 15 have been restored to mid-position and the electrical circuit again broken.

To insure proper electrical connections between the contacts 40, 41, 42, and 43 and the rings 36 and 38 and segments 37 and 39 and to prevent more than one of the contacts 42 43 from being in engagement with its segment at one time, I prefer to move the spur-wheel 15 positively up or down on the shaft 8 on each change in the direction of movement of the steering-wheel, and this I accomplish in the following manner: Secured to the shaft 8 are upper and lower cam-collars 55 and 56, these collars acting upon the upper and lower ends of a sleeve 57, which surrounds the shaft 8, is free to turn and to move up and down thereon, and serves as a bearing for the hub of the spur-wheel 15, suitable collars 59 and 60, secured to said sleeve above and below the hub of the spur-wheel, insuring the vertical movement of the latter with the sleeve. The upper collar 59 is grooved and is acted upon by a segmental friction brake-shoe 61, which is hung to a pin 62 at one side of the shaft 8 and at the other side of said shaft is acted upon by a spring 63, surrounding a pivoted rod 64, which passes freely through an opening in the free end of said brake-shoe. (See Fig. 4.) The frictional hold of the brake-shoe upon the collar 59 is sufficient to prevent turning of the sleeve 57 when it is first acted upon by either of the cam-collars 55 or 56. Hence the first action of either of said collars is to force the sleeve upward or downward on the shaft 8, so as to carry the spur-wheel 15 up or down with it until the contact-plates on said wheel are pressed firmly against the upper or lower contacts mounted upon the fixed frame, further rotative movement of the shaft 8 being then imparted to the sleeve 57, the brake-shoe 61 slipping over the collar 59 until the direction of motion is reversed. The cam-collars are such that the wheel 15 will be pressed upward when moving in the direction of the arrow, Fig. 5, and downward when moving in the reverse direction. Hence each segment will be pressed against its contact when the wheel is moving toward the midship position with respect to that segment, and each segment may therefore extend up close to the midship-line.

While I therefore prefer to use mechanism for moving the spur-wheel 15 longitudinally on the shaft 8 on each reversal of the direction of movement of the steering-wheel, the same is not absolutely essential to the proper carrying out of my invention and may be omitted, if desired, the contacts 42 and 43 having resilient spring-backings and said contacts or the ends of the segments 37 and 39 being beveled, so that the contacts will easily ride onto the segments as the latter are moved beneath the same. In this case, however, the ends of the segments cannot approach closely to the midship-line of the wheel, as a sufficient space on each side of the midship-line will have to be left to insure the breaking of the current until the contact of the lever 25 is moved away from the terminals 50 and 51. Hence the regulation cannot be so accurate as when the wheel 15 moves longitudinally on the shaft 8.

Various means other than the valves 30 and valve-levers 34 may be employed for opening communication between the opposite ends of the cylinder 20. In fact, the mechanical details of the apparatus may be varied in many ways without departing from the essential features of my invention so long as electromagnetic compensating devices are employed which rely for their action upon want of correlation between the piston operated by the steering-wheel and that which operates the rudder-moving devices.

Having thus described my invention, I claim and desire to secure by Letters Patent—

1. Power steering apparatus in which are combined a transmitting-cylinder having a piston operated by the steering-wheel, a controlling-cylinder having a piston governing the operation of the rudder-moving devices, means whereby movement of the piston in the transmitting-cylinder is caused to impart movement to the piston in the controlling-cylinder, electromagnetically-operated mechanism whereby movement of the piston in the transmitting-cylinder is permitted without corresponding movement of the piston in the controlling-cylinder, and connections whereby said electromagnetic devices are rendered operative by want of correlation in the positions of the two pistons, substantially as specified.

2. Power-actuated steering apparatus having in combination a transmitting-cylinder with piston actuated by the steering-wheel, a controlling-cylinder with piston governing the rudder-moving devices, means whereby movement of the piston in the transmitting-cylinder causes movement of the piston in the controlling-cylinder, electromagnetic devices for permitting movement of the piston in the transmitting-cylinder without movement of the piston in the controlling-cylinder, and two circuit-closers, one operated by the piston of the controlling-cylinder and the other by the steering-wheel.

3. Power-actuated steering apparatus having in combination a transmitting-cylinder with piston actuated by the steering-wheel, a controlling-cylinder with piston governing the rudder-moving devices, means whereby movement of the piston in the transmitting-cylinder causes movement of the piston in the controlling-cylinder, electromagnetic devices for permitting movement of the piston in the transmitting-cylinder without movement of the piston in the controlling-cylinder, and two circuit-closers, one operated by the piston of the controlling-cylinder and the other by the steering-wheel, the latter circuit-closer having two contacts, one operative when the rudder moves to starboard, and the other operative when the rudder moves to port.

4. Power-actuated steering apparatus having in combination a transmitting-cylinder with piston actuated by the steering-wheel, a controlling-cylinder with piston governing the rudder-moving devices, means whereby movement of the piston in the transmitting-cylinder causes movement of the piston in the controlling-cylinder, electromagnetic devices for permitting movement of the piston in the transmitting-cylinder without movement of the piston in the controlling-cylinder, and two circuit-closers, one operated by the piston of the controlling-cylinder and the other by the steering-wheel, the latter circuit-closer having two contacts one operative when the rudder moves to starboard and the other operative when the rudder moves to port, and being combined with means whereby the contacts are alternately thrown into and out of action by the port and starboard movements of the steering-wheel.

5. The combination in power steering mechanism, of a wheel having upper and lower contacts with projecting segments on opposite sides of the axial line of the wheel, fixed contacts forming part of an electric circuit, one adapted to engage with one segment and the other with the opposite segment, and means for moving said contact-carrying wheel in unison with the movements of the steering-wheel.

6. The combination in power steering mechanism, of a wheel having contact-plates on opposite sides, terminals disposed on opposite sides of the wheel, a shaft in operative connection with the steering-wheel, and cam-collars on said shaft whereby the contact-carrying wheel will be moved longitudinally thereon whenever the direction of movement of the steering-wheel is reversed.

7. The combination in power steering mechanism, of a wheel having contact-plates on opposite sides of the same, contacts disposed on opposite sides of the wheel, a shaft operatively connected with the steering-wheel, a sleeve carrying the contact-wheel and free to turn and to move longitudinally on said shaft, cam-collars for effecting such longitudinal movement, and a friction-brake for preventing rotation of the sleeve during the first action of the cam-collars.

In testimony whereof I have signed my name to this specification in the presence of two subscribing witnesses.

JOHN D. WILLIAMSON, JR.

Witnesses:
    F. E. BECHTOLD,
    JOS. H. KLEIN.